United States Patent
Deneuve et al.

(10) Patent No.: US 11,891,958 B2
(45) Date of Patent: **\*Feb. 6, 2024**

(54) METHOD AND DEVICE FOR ESTIMATING A DEAD ZONE OF A TURBOMACHINE DISCHARGE VALVE

(71) Applicant: SAFRAN AIRCRAFT ENGINES, Paris (FR)

(72) Inventors: Sébastien Jean Fernand Deneuve, Moissy-Cramayel (FR); Jérôme Pascal Laurent Patrick Tronche, Moissy-Cramayel (FR)

(73) Assignee: SAFRAN AIRCRAFT ENGINES, Paris (FR)

( \* ) Notice: Subject to any disclaimer, the term of this patent is extended or adjusted under 35 U.S.C. 154(b) by 329 days.

This patent is subject to a terminal disclaimer.

(21) Appl. No.: 17/609,867

(22) PCT Filed: May 15, 2020

(86) PCT No.: PCT/EP2020/063596
§ 371 (c)(1),
(2) Date: Nov. 9, 2021

(87) PCT Pub. No.: WO2020/229655
PCT Pub. Date: Nov. 19, 2020

(65) Prior Publication Data
US 2022/0213841 A1    Jul. 7, 2022

(30) Foreign Application Priority Data

May 16, 2019   (FR) ...................................... 1905102

(51) Int. Cl.
*F02C 9/18*   (2006.01)
*F02C 6/08*   (2006.01)
(Continued)

(52) U.S. Cl.
CPC .............. *F02C 9/18* (2013.01); *B64D 31/00* (2013.01); *F02C 6/08* (2013.01); *F02C 9/16* (2013.01)

(58) Field of Classification Search
CPC ...... F02C 9/18; F02C 6/08; F02C 9/16; F04D 27/0215; F04D 27/023; F04D 2260/80; B64D 31/00
See application file for complete search history.

(56) References Cited

U.S. PATENT DOCUMENTS 3,886,790 A * 6/1975 Plett ..................... G01L 5/133
73/112.04
5,980,201 A * 11/1999 Benoist .................. F01D 11/24
415/176
(Continued)

FOREIGN PATENT DOCUMENTS

| EP | 2 060 746 A1 | 5/2009 |
|----|--------------|--------|
| FR | 2 982 904 A1 | 5/2013 |
| FR | 3 022 606 A1 | 12/2015 |

OTHER PUBLICATIONS

International Search Report for PCT/EP2020/063596 dated Jul. 22, 2020 [PCT/ISA/210].

*Primary Examiner* — Mussa A Shaawat
(74) *Attorney, Agent, or Firm* — Sughrue Mion, PLLC

(57) ABSTRACT

The invention relates to a method for estimating a dead zone at closing of a flap (P1) of a discharge valve (VBV1) of a turbomachine, in which the actual position of the actuator (V1) is measured for a setpoint closing signal of the flap (P1), a static angle is determined from the actual position, a closing dead zone is determined, corresponding to the fact that the joint (J1) is compressed so as to not let the primary flow pass through the orifice (O1) in the secondary flow, by the fact that the dead zone is equal to a reference dead zone, which has been predetermined on a reference turbomachine (Continued)

Figure 1:
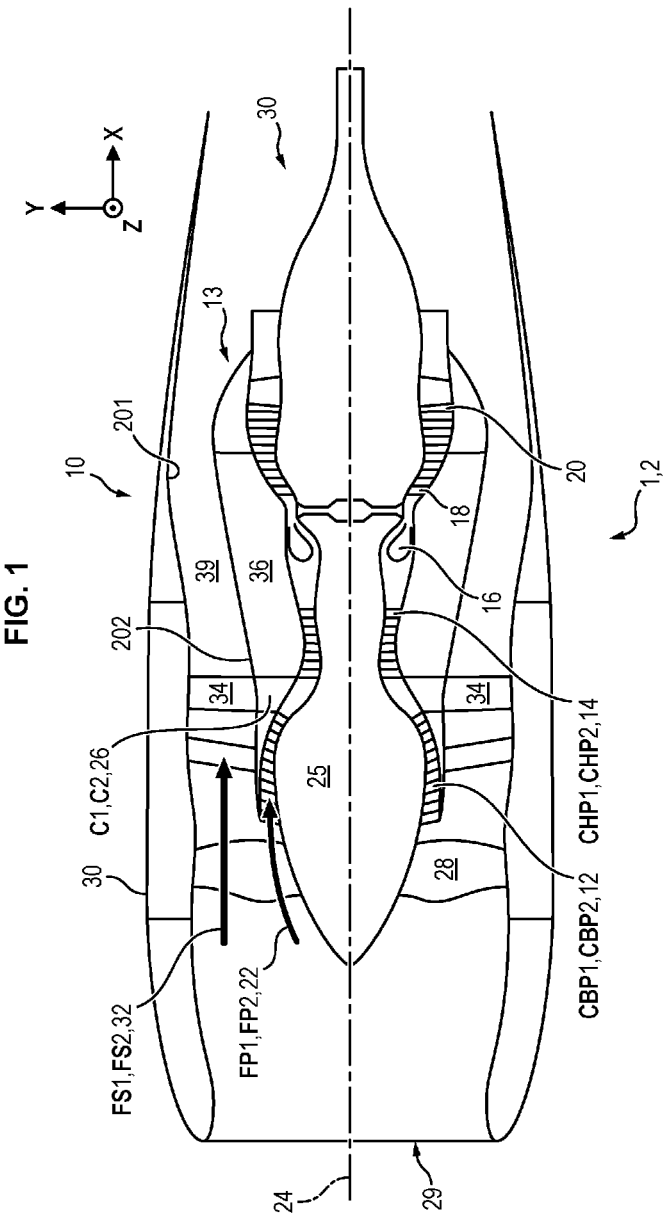

operating on the ground, to which the measured static angle has been added and from which a reference static angle, which has been predetermined on the reference turbomachine operating in flight, has been subtracted.

8 Claims, 10 Drawing Sheets

(51) Int. Cl.
 *F02C 9/16* (2006.01)
 *B64D 31/00* (2006.01)

(56) References Cited

U.S. PATENT DOCUMENTS

| | | | |
|---|---|---|---|
| 6,149,074 A * | 11/2000 | Friedel | F01D 11/24 165/169 |
| 9,958,071 B1 * | 5/2018 | Kamp | F16C 33/7886 |
| 10,371,158 B2 * | 8/2019 | Sorokes | F04D 29/441 |
| 11,674,408 B1 * | 6/2023 | Menheere | F16K 7/17 415/145 |
| 2007/0005219 A1 * | 1/2007 | Muramatsu | F01D 21/003 701/100 |
| 2007/0240677 A1 | 10/2007 | Sasaki | |
| 2009/0193811 A1 * | 8/2009 | Monteiro | F02C 9/18 60/782 |
| 2011/0097196 A1 * | 4/2011 | Colotte | F04D 27/0215 415/145 |
| 2015/0139775 A1 | 5/2015 | Kumar et al. | |
| 2018/0066573 A1 * | 3/2018 | Ehrmann | F02C 6/12 |
| 2018/0195465 A1 * | 7/2018 | Bruhat | F01D 17/148 |
| 2019/0003387 A1 * | 1/2019 | Ponyavin | F04D 29/663 |
| 2019/0187732 A1 * | 6/2019 | Angevin | F02C 6/08 |
| 2019/0301355 A1 * | 10/2019 | Walkingshaw | F02B 37/186 |
| 2019/0309762 A1 * | 10/2019 | Caratge | F04D 27/0215 |
| 2019/0367176 A1 * | 12/2019 | Pora | B64D 37/005 |
| 2020/0095944 A1 * | 3/2020 | Goodman | F01D 17/105 |
| 2020/0232393 A1 * | 7/2020 | Bulot | F02C 7/18 |
| 2020/0386109 A1 * | 12/2020 | Becker | F01D 9/041 |

* cited by examiner

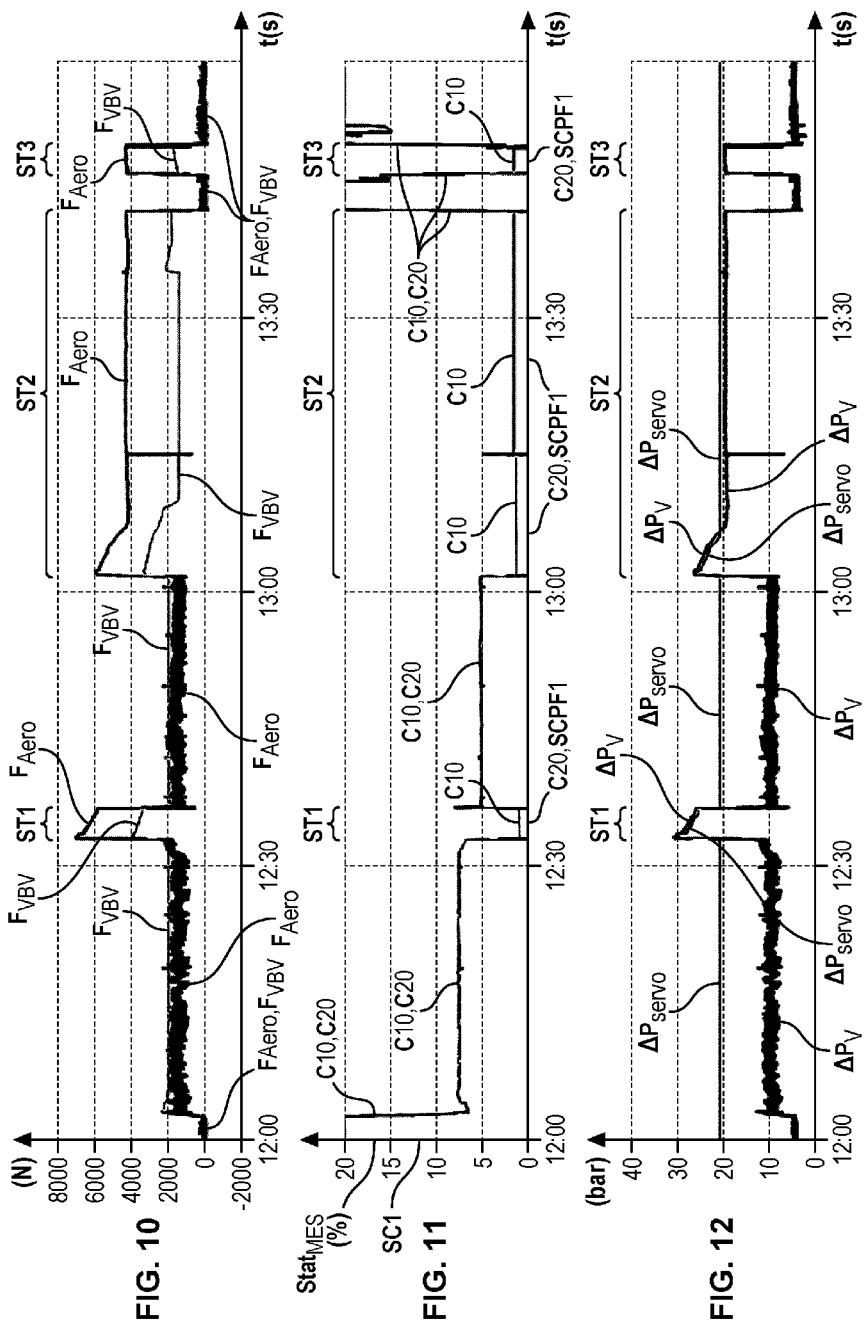

METHOD AND DEVICE FOR ESTIMATING A DEAD ZONE OF A TURBOMACHINE DISCHARGE VALVE

The invention relates to a method and a device for estimating a closing dead zone of a turbomachine discharge valve.

One field of application relates to aircraft turbomachine, such as for example aircraft turbojets.

Document US2007/240677 describes a method for controlling a flap valve for gas recirculation, in which a dead band is taken into account.

Discharge valves (VBV for "variable bleed valve") allow discharging a portion of the primary flow into the secondary flow.

The invention applies in particular to discharge valves each comprising a gate actuated in pivoting on a hinge by an actuator, to open and close an orifice provided on a wall of a casing which delimits in part an outer wall of a stream of primary flow of the turbomachine. The gates are generally installed on an inner shroud of a structural casing of the turbomachine, which can for example be an intermediate casing which can in particular constitute a load path for the suspension of the turbomachine from a structure of an aircraft such as a pylon. The inner shroud of the structural casing has a wall which faces, inside, the stream of the primary flow. The opening of the gates allows discharging a portion of the flow rate of the primary flow to a stream of the secondary flow of the turbomachine, while passing through an inter-stream compartment which separates the stream of the primary flow from the stream of the secondary flow. Each gate is equipped with a seal gasket, which is compressed against the orifice so that the latter can be closed with a good seal.

There exists however an angular movement range of the gate, called the closing dead zone, during which the gasket remains compressed during the opening of the gate and therefore does not let the primary flow pass into the secondary flow. In other words, as long as the position of the gate remains in the dead zone range, the gate remains sealed even though it is not completely closed.

It is desired to estimate what the dead zone is on each turbomachine, because it differs on each turbomachine due in particular to deviations in assembly and manufacture.

One possibility is to carry out tests for characterizing the dead zone of each turbomachine, by determining the permeability of its discharge valves, i.e. the angle starting at which the gates are sealed. These tests consist of sweeping different angles of the gate at a fixed speed. These tests are time-consuming and must be carried out for each operating point where it is desired to know the dead zone.

The invention aims to obtain a method and a device for estimating the dead zone, which do not necessitate the performance of a specific test on each turbomachine.

To this end, a first subject matter of the invention is a method for estimating a closing dead zone of a first gate of a first discharge valve mounted on a first casing of a turbomachine to be investigated, which can operate in flight to propel an aircraft, the first casing delimiting in its inside a primary gas flow of the turbomachine, the first gate being designed to be able to be moved angularly by a first actuator depending on a first control signal of the first actuator between one and the other of:

a first opening position of a first orifice of the first casing configured to discharge by this first orifice a portion of the primary flow into a secondary gas flow located outside the first casing, and a first closing position of the first orifice configured to prevent the primary flow from passing through the first orifice, the first gate being provided with a first gas seal gasket, able to be compressed against a first edge of the first orifice in the first closing position to seal the closure of the first orifice, characterized in that for the turbomachine to be investigated, operating in flight, the first actual position of the first actuator is measured when the first control signal is equal to a first set point closing signal of the first gate, based on the first actual position, a measured droop angle of the first gate with respect to the first casing is determined, for the turbomachine to be investigated, operating in flight, a measured closing dead zone of the first gate is determined, in which the first gasket remains compressed and thus seals the closure of the first orifice, by the fact that the measured closing dead zone is equal to a reference dead zone, which was predetermined during operation on the ground on a reference turbomachine which can operate in flight and on the ground, to which has been added the measured droop angle and from which has been subtracted a reference droop angle which was predetermined on the reference turbomachine operating in flight to propel an aircraft.

The invention thus defines a dead zone estimator based on static measurements which can be obtained "as a passenger" of other tests and therefore do not necessitate a specific test.

According to one embodiment of the invention, which can be applied to the estimating method and/or to the estimating device, the reference turbomachine has a second gate of a second discharge valve mounted on a second casing of the reference turbomachine, the second casing delimiting in its inside a primary gas flow of the reference turbomachine, the second gate being designed to be able to be moved angularly by a second actuator depending on a second control signal of the second actuator between one and the other of:

a second opening position of a second orifice of the second casing to discharge through this second orifice a portion of the primary flow into a secondary gas flow of the reference turbomachine located outside the second casing, and a second closing position of the second orifice to prevent the primary flow from passing through the second orifice, the second gate being provided with a second gas seal gasket, able to be compressed against a second edge of the second orifice in the second closing position to seal the closure of the second orifice.

According to one embodiment of the invention, for the reference turbomachine operating on the ground, the reference dead zone is determined, which is a second angular closing range of the second gate, during which, between the second closing position and the second opening position, the second gasket remains compressed and thus seals the closure of the second orifice.

According to one embodiment of the invention, for the turbomachine to be investigated, operating in flight, a first rotation speed of a first high-pressure compressor of the turbomachine to be investigated, and measured operating parameters comprising at least one quantity selected from among a first atmospheric pressure and a first altitude are determined, based on a model of the reference turbomachine giving a second gate angle of the reference turbomachine with respect to the second casing of the reference turbomachine, depending on a second rotation speed of the second high-pressure compressor of the reference turbomachine and on a second atmospheric pressure of the reference turbomachine or on a second operating altitude of the reference turbomachine, the reference droop angle is determined, which is the second gate angle of the reference turbomachine which corresponds according to the model to the measured operating parameters, the second gate angle corresponding to an angle of the second gate with respect to the second casing, which has been determined based on a second actual position of the second actuator, having itself been measured for the reference turbomachine operating in flight, when the second control signal is equal to a second set point closing signal of the second gate.

A second subject matter of the invention is a device for estimating a closing dead zone of a first gate of a first discharge valve mounted on a first casing of a turbomachine to be investigated which can operate in flight to propel an aircraft, the first casing delimiting in its inside the primary gas flow of the turbomachine, the first gate being designed to be able to be moved angularly by a first actuator depending on a first control signal of the first actuator between one and the other of:
a first opening position of a first orifice of the first casing configured to discharge through this first orifice a portion of the primary flow into a secondary gas flow located outside the first casing,
and a first closing position of the first orifice configured to prevent the primary flow from passing through the first orifice,
the first gate being provided with a first gas seal gasket, able to be compressed against a first edge of the first orifice in the first closing position to seal the closure of the first orifice,
characterized in that the estimation device comprises
a measurement means for measuring, for the turbomachine to be investigated operating in flight, the first actual position of the first actuator when the first control signal is equal to a first set point closing signal of the first gate,
a calculator configured to:
determine, based on the first actual position, a measured droop angle of the first gate with respect to the first casing,
determine, for the turbomachine to be investigated operating in flight, a measured closing dead zone of the first gate, in which the first gasket remains compressed and thus seals the closure of the first orifice, by the fact that the measured closing dead zone is equal to a reference dead zone, which was predetermined during operation on the ground on a reference turbomachine which can operate in flight and on the ground, to which has been added the measured droop angle and from which has been subtracted a reference droop angle which was predetermined on the reference turbomachine operating in flight for propelling an aircraft.

According to one embodiment of the invention, the estimation device comprises a measurement means for determining, for the reference turbomachine operating on the ground, the reference dead zone, which is a second angular closing range of the second gate, during which, between the second closing position and the second opening position, the second gasket remains compressed and thus seals the closure of the second orifice.

According to one embodiment of the invention, the estimation device comprises on-board measurement sensors of the first turbomachine to determine, for the turbomachine to be investigated operating in flight, a first rotation speed of a first high-pressure compressor of the turbomachine, and measured operating parameters comprising at least one quantity selected from among a first atmospheric pressure and a first altitude,
the calculator being configured to determine, from a model of the reference turbomachine giving a second gate angle of the reference turbomachine with respect to the second casing of the reference turbomachine depending on a second rotation speed of the second high-pressure compressor of the reference turbomachine and from a second atmospheric pressure of the reference turbomachine or from a second operating altitude of the reference turbomachine, the reference droop angle, which is the second gate angle of the reference turbomachine which corresponds according to the model to the measured operating parameters,
a measurement means for measuring, for the reference turbomachine operating in flight, a second actual position of the second actuator, when the second control signal is equal to a second set point closing signal of the second gate,
the calculator being configured to determine the second gate angle corresponding to the angle of the second gate with respect to the second casing, based on the second actual position of the second actuator which was measured.

Figure 2:
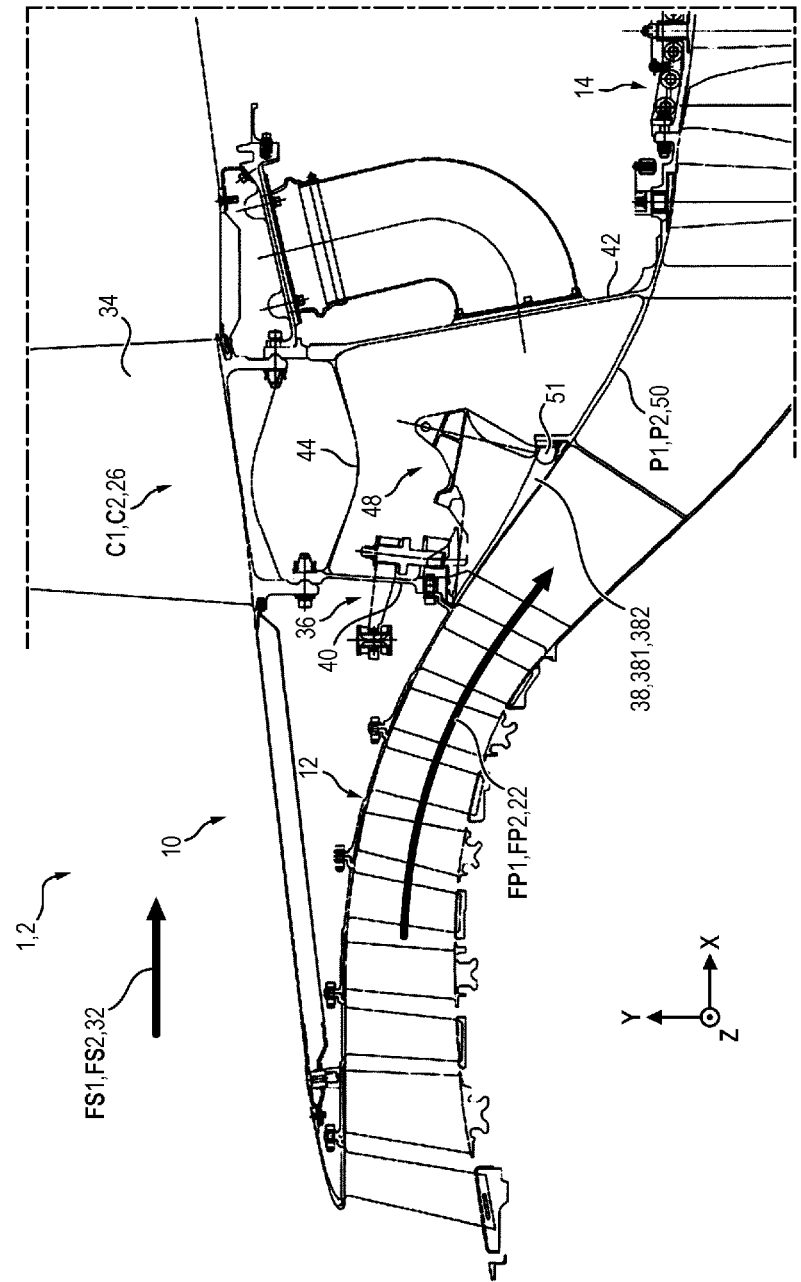
Figure 3:
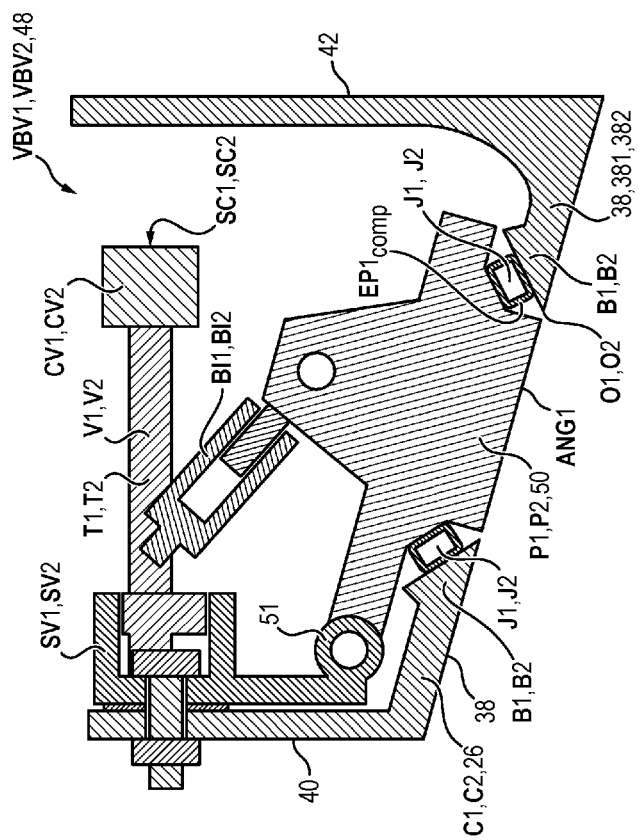
Figure 4:
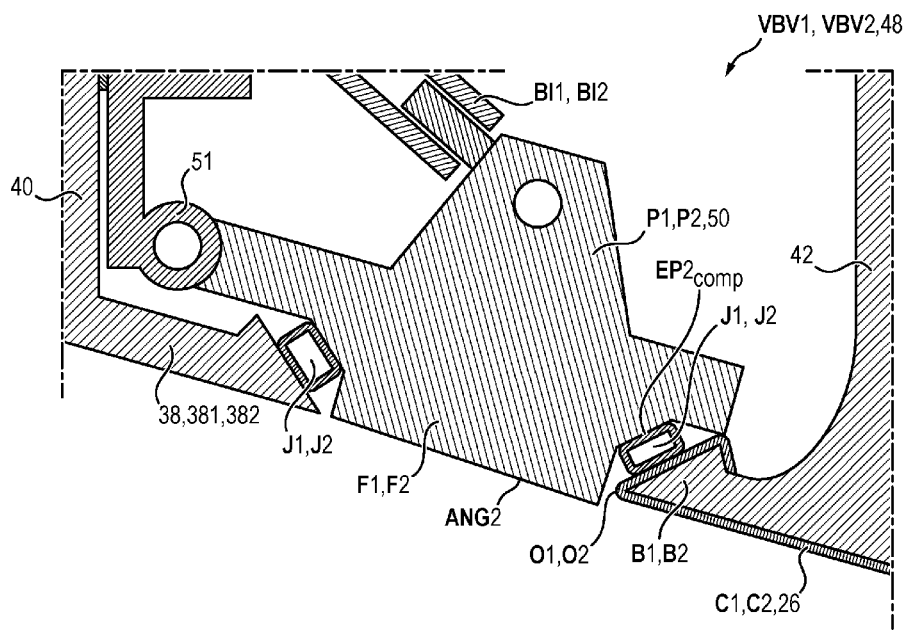
Figure 5:
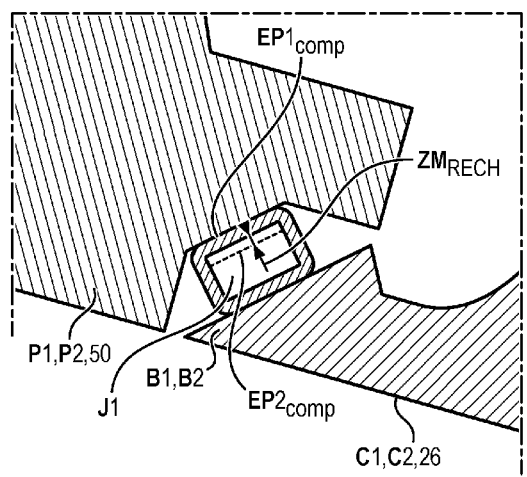
Figure 7:
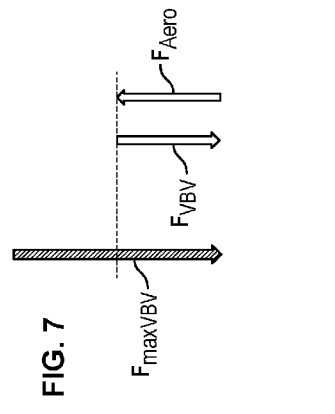
Figure 9:
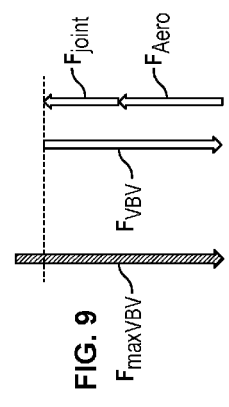
Figure 6:
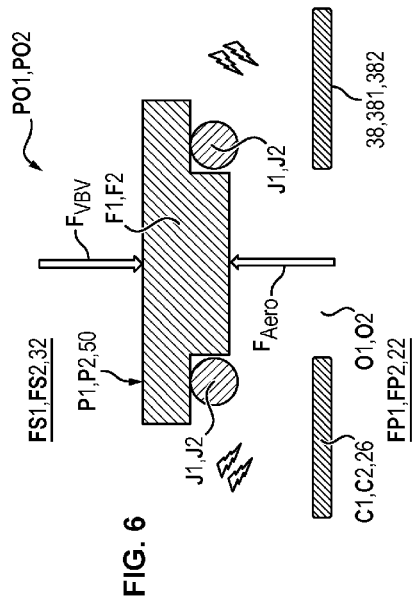
Figure 8:
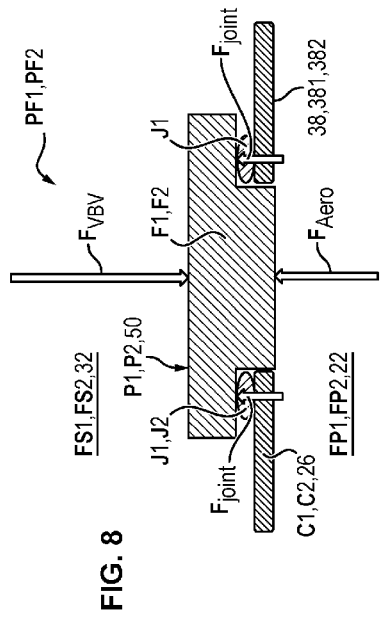
Figure 14:
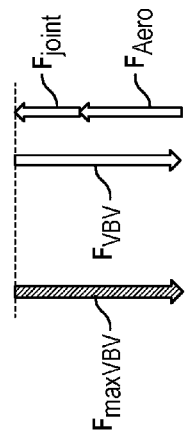
Figure 13:
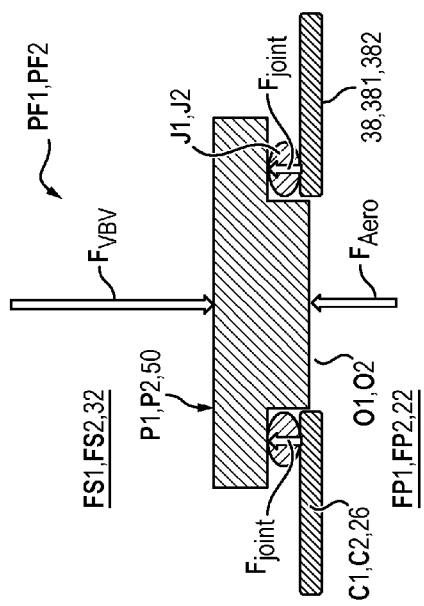
Figure 15:
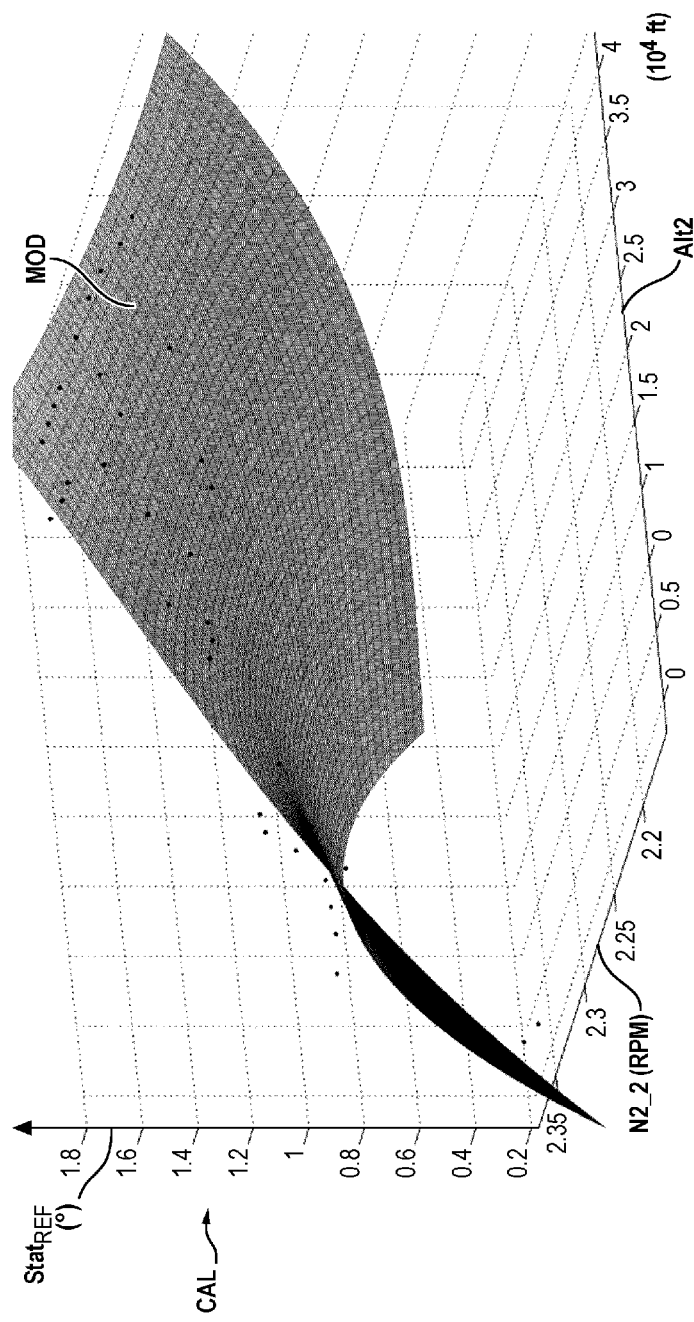
Figure 17:
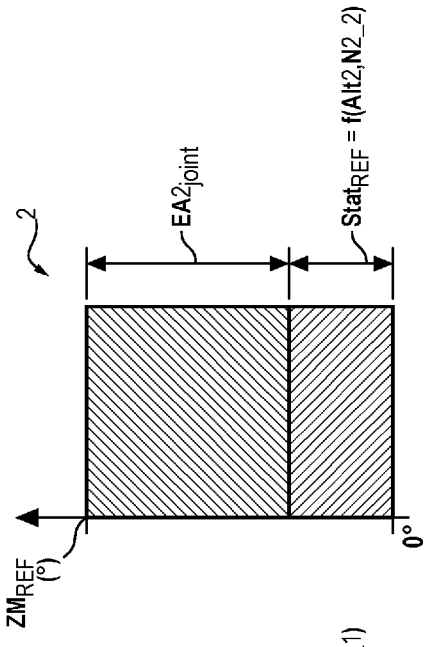
Figure 16:
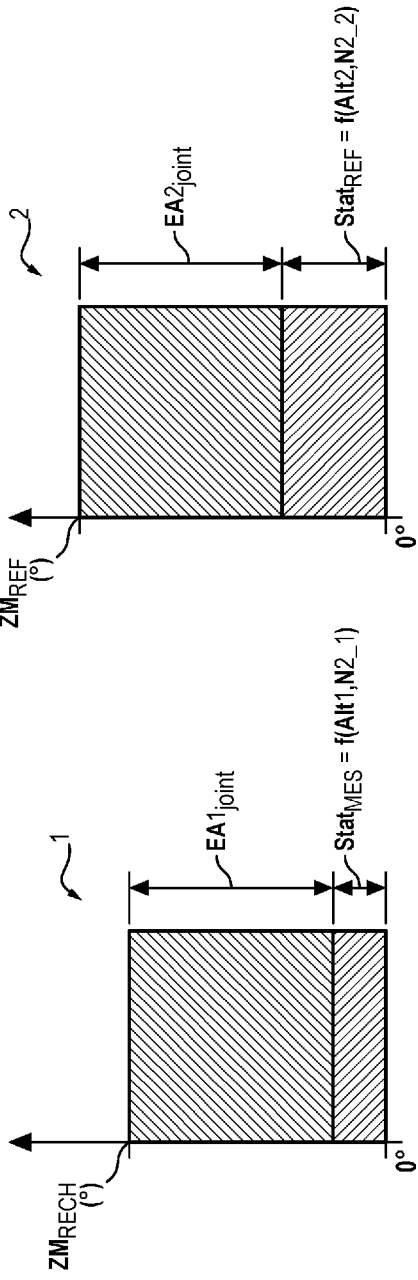
Figure 18:
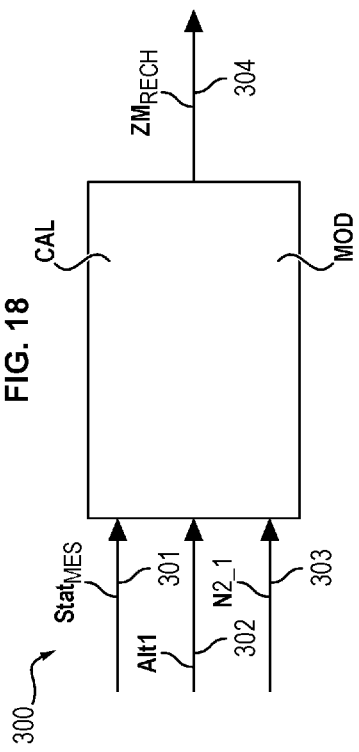
Figure 19:
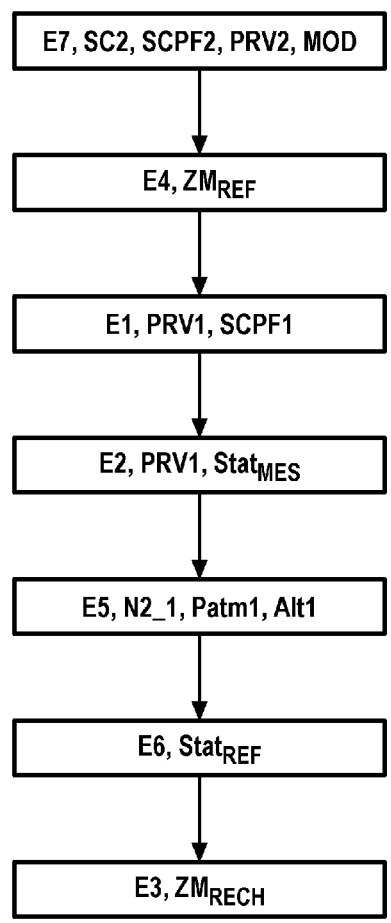

The invention will be better understood upon reading the description that follows, given solely by way of a non-limiting example with reference to the appended drawings, in which:

FIG. 1 shows schematically in longitudinal section an example of a turbomachine to which the estimation device and method according to the invention can apply, FIG. 2 shows schematically in longitudinal section an enlarged view in the closing position of a gate of an intermediate casing of the turbomachine of FIG. 1, to which the estimation device and method according to the invention can apply, FIG. 3 shows schematically in longitudinal section an enlarged view in the closing position of a gate of an intermediate casing of the turbomachine of FIG. 1, to which the estimation device and method according to the invention can apply, FIG. 4 shows schematically in longitudinal section an enlarged view in the closing position of a gate of an intermediate casing of the turbomachine of FIG. 1, to which the estimation device and method according to the invention can apply, FIG. 5 shows schematically in longitudinal section an enlarged view in the closing position of a gate of an intermediate casing of the turbomachine of FIG. 1, to which the estimation device and method according to the invention can apply, FIG. 6 shows schematically in longitudinal section an enlarged view in the opening position of a gate of an intermediate casing of the turbomachine of FIG. 1, to which the estimation device and method according to the invention can apply, FIG. 7 shows schematically forces appearing on the gate of the intermediate casing of FIG. 6, FIG. 8 shows schematically in longitudinal section an enlarged view in the closing position of a gate of an intermediate casing of the turbomachine of FIG. 1, to which the estimation device and method according to the invention can apply, FIG. 9 shows schematically forces appearing on the gate of the intermediate casing of FIG. 8, FIG. 10 is a diagram showing respectively forces which can appear during control of the gate of the turbomachine according to FIGS. 1 to 5, FIG. 11 is a diagram showing respectively gate angles which can appear during control of the gate of the turbomachine according to FIGS. 1 to 5, FIG. 12 is a diagram showing pressure differences which can appear during control of the gate of the turbomachine according to FIGS. 1 to 5, FIG. 13 shows schematically in longitudinal section an enlarged view in the closing position of a gate of an intermediate casing of the turbomachine of FIG. 1, to which the estimation device and method according to the invention can apply, FIG. 14 shows schematically forces appearing on the gate of the intermediate casing of FIG. 13, FIG. 15 shows schematically a mapping of a reference dead zone, which can be used by the estimation device and method according to the invention, FIGS. 16 and 17 show schematically the composition of the dead zone of the first and second turbomachines, FIG. 18 is a modular synopsis of an example of a dead zone estimator implementing the estimation device and method according to the invention, FIG. 19 is an example of a flowchart of the estimation method according to the invention.

An example of a double flow turbomachine is shown in FIGS. 1 and 2. The turbomachine 10, 1, 2 is intended to be installed on an aircraft, not shown, to propel it in the air. The turbomachine 10 or gas turbine engine assembly has a longitudinal axis 24. The direction extending from the interior to the exterior is the radial direction starting from the longitudinal axis 24. The turbomachine 10 is for example of the two-bodies type. The turbomachine 10 comprises a fan assembly 28 and an assembly 13 for generating combustion gases and their use, also called a "gas generator." The gas generator 13 comprises, from upstream to downstream in the flow direction of the gases, a low-pressure compressor 12, a high-pressure compressor 14, a combustion chamber 16, a high-pressure turbine 18 and a low-pressure turbine 20 which define a primary gas flow 22. The fan assembly 28 comprises an array of fan blades extending radially outward from a rotor disk 25. The turbomachine 10 has an intake side 29 and an exhaust side 30. The turbomachine 10 also comprises a set of casings which define an inter-stream compartment 36 also called the "core zone", located between a primary flow stream and a secondary flow stream of the double-flow turbomachine. An upstream portion of the inter-stream compartment 36 is formed by a structural casing 26 connected by arms 34 to the internal wall 201 of the duct 30 through the bypass channel 39 of the secondary flow 32. This structural casing 26 is for example an intermediate casing, and will be so designated in the description of the exemplary embodiment that follows, but other types of structural casings are possible, for example an inter-compressor casing interposed between the low-pressure compressor 12 and the high-pressure compressor 14.

In operation, the air flows through the fan assembly 12 and a first portion 22 (primary flow 22) of the air flow is routed through the high-pressure compressor 14, in which the air flow is compressed and sent to the combustion chamber 16. The hot combustion products (not shown in the figures) originating in the combustion chamber 16 are used to drive the turbines 18 and 20, and the low-pressure turbine 20 is connected to the fan assembly 28 to produce the major part of the thrust of the turbomachine 10. The turbomachine 10 also comprises a bypass channel 39 which is used to pass a second portion 32 (secondary flow 32) of the air flow vented from the fan assembly 28 around the central gas turbine engine 13. More precisely, the bypass channel 39 extends between an internal wall 201 of a fan duct 30 or nacelle 30 and an external envelope 202 of the inter-stream compartment 36, also called IFD for "inner fan duct."

In FIGS. 2 to 5, the intermediate casing 26 comprises an internal wall 38 delimiting on the inside the flow space of the primary flow 22, an upstream flange 40 and a downstream flange 42 connected to the exterior surface of the internal wall 38, and an external wall 44 connecting on the outside the upstream flange 40 and the downstream flange 42. The arms 34 are fastened to the outer ends of the upstream flange 40 and of the downstream flange 42. The intermediate casing 26 is equipped with a discharge valve 48, or with several discharge valves 48.

A first turbomachine 1 is considered, called the turbomachine to be investigated, similar to the turbomachine 10 as described above, for which a closing dead zone $ZM_{RECH}$ will be determined. The following reference symbols, ending with 1, designate the portions and variables of this first turbomachine 1, introduced by the adjective "first," of which those mentioned above in FIGS. 1 to 5 are recalled.

Also considered is a second turbomachine 2, called the reference turbomachine, similar to the turbomachine 10 as described above, for which the reference dead zone $ZM_{REF}$ has been determined. The following reference symbols, ending in 2, designate the portions and variable of this second turbomachine 2, introduced by the adjective "second," of which those mentioned above in FIGS. 1 to 5 are recalled. Of course, what is described for the first turbomachine 1 below is equally valid for the second turbomachine 2. Of course, the reference turbomachine 2 or second turbomachine 2 can be different from that described below and above.

In the first turbomachine 1, each first discharge valve VBV1, 48 comprises a first gate 50, P1 mounted on the first intermediate casing 26, C1. The first casing 26, C1 delimits on the inside the first primary gas flow 22, FP1. The first gate 50, P1 is mounted pivoting on a hinge 51 and is connected to a first actuator V1 designed to be able to angularly move the first gate 50, P1 depending on a first control signal SC1 of the first actuator V1. The first internal wall 38, 381 of the first intermediate casing 26, C1 comprises a first orifice O1 with a shape corresponding to the first gate 50, P1. A certain number N of first gates 50, P1 can be provided on the first intermediate casing 26, C1, actuated by a certain number M of first actuators, with for example M<N. For example, the first actuator(s) V1 actuate one or some first gate(s) 50, P1, said to be driving, and all the first gates 50, P1 are connected via a ring which allows having uniform actuation of the first gates 50, P1. The need for discharging the first low-pressure compressor 12, CBP1 is manifested in protection laws. These laws being a representation of an actual discharge flow rate depending on the configuration and the condition of the engine, they must take into account the effective cross section of the first gate and therefore of the dead zone which affects this flow rate.

The first actuator V1 comprises a first actuator body CV1 fixed with respect to the first intermediate casing 26, C1 and a first shaft T1 movable in translation with respect to the first actuator body CV1. At least one first connection member BI1, comprising for example a connecting rod BI1 and articulation devices, is mounted between the first shaft T1 and the first gate P1 to move angularly the first gate P1 by movement in translation of the first shaft T1 with respect to the first actuator body CV1. The first actuator V1 can be a hydraulic actuator, the movement in translation of the movable shaft T1 of which is controlled by the difference in oil pressure on either side of a piston sliding in the body CV1.

The first gate 50, P1 comprises, in FIGS. 6 and 7, a first opening position PO1 of the first orifice O1, where the first gasket J1 is at a distance from the first edge B1, to discharge through this first orifice O1 a portion of the first primary flow FP1, 22 into the first secondary gas flow FS1, 32 located outside the first intermediate casing 26, C1.

The first gate 50, P1 comprises, in FIGS. 8 and 9, a first closing position PF1 of the first orifice O1 so as not to allow the first primary flow FP1, 22 to pass through the first orifice O1 into the first secondary flow FS1, 32. The first actuator V1 allows moving the first gate 50, P1 from the first opening position PO1 to the first closing position PF1 in a closing direction, and from the first closing position PF1 to the first opening position PO1 in an opening direction.

The first gate 50, P1 is provided with a first gas seal gasket J1, able to be compressed against a first edge B1 of the first orifice O1 in the first closing position FP1 so as not to let the first primary flow FP1 pass through the first orifice O1 into the first secondary flow FS1.

In FIGS. 3, 4, 5, 6, 8 and 13, each first gate 50, P1 comprises a first gate casting F1 against which is fastened the first gasket J1.

In FIGS. 6 and 7, when the first gate 50, P1 is in the first opening position PO1, the force $F_{VBV}$ in the first actuator V1 balances the aerodynamic force $F_{Aero}$.

In FIGS. 8 and 9, when the first gate 50, P1 is in the first closing position PF1, the first gasket J1 is compressed against the first edge B1 of the first intermediate casing 26, C1 so as to ensure the sealing of the first gate 50, P1 and to provide a smoother primary stream in the flow space of the primary flow 22, i.e. that the first gate 50, P1 is aligned with the first internal wall 38, 381. The force $F_{VBV}$ in the first actuator V1 then balances the aerodynamic force $F_{Aero}$, which depends on the operating point and the forces $F_{joint}$ compressing the gasket, which depend on the angular position of the first gate 50, P1 and therefore on the depression of the first gate 50, P1 in the primary stream.

In the first closing position PF1, the first gate 50, P1 can occupy, with respect to the first casing 26, C1, C2 several different angles located in a certain angular range, called the measured closing dead zone $ZM_{RECH}$, which is due to the flexibility of the first gasket J1 and during which the first gasket J1 does not allow the first primary flow FP1 to pass through the first orifice O1 into the first secondary flow FS1 (effective cross section is zero in this case for the first gate 50, P1). For example, in FIGS. 3 and 5, the first gate 50, P1 can occupy in the first closing position PF1 a certain angle ANG1 with respect to the first casing 26, C1, C2, which makes the first gasket J1 assume a certain compression thickness $EP1_{comp}$ against the first edge B1, where the first gasket J1 does not allow the first primary flow FP1 to pass through the first orifice O1 into the first secondary flow FS1. In FIGS. 4 and 5, the first gate 50, P1 can occupy in the first closing position PF1 another angle ANG2 more depressed into the primary stream than with the angle ANG1, which causes the first gasket J1 to assume a compression thickness $EP2_{comp}$ against the first edge B1, which is smaller than the compression thickness $EP1_{comp}$ and where the first gasket J1 does not allow the first primary flow FP1 to pass through the first orifice O1 into the first secondary flow FS1. The angular range of the first gate 50, P1 corresponding to the difference between the compression thickness $EP1_{comp}$ and the compression thickness $EP2_{comp}$ is comprised in the measured closing dead zone $ZM_{RECH}$.

According to the invention, the measured closing dead zone $ZM_{RECH}$ is calculated based on the reference dead zone $ZM_{REF}$ which was determined on the reference turbomachine 2 operating on the ground, by correcting it by the difference between the droop $Stat_{MES}$ (or statism or offset) measured on the first gate P1 of the first turbomachine 1 operating in flight and the reference droop angle $Stat_{REF}$ which was predetermined on the second turbomachine 2 operating in flight.

Reference can be made below to FIGS. 16 to 18.

According to the invention, during a measurement step E1, the first actual position PRV1 of the first actuator V1 is measured for the first turbomachine 1 operating in flight when the first control signal SC1 is equal to a first set point closing signal SCPF1 of the first gate P1, for example by a position sensor of the first actuator V1 or by other measurement means. For example, the first actual position PRV1 in translation of the first shaft T1 of the first actuator V1 is measured with respect to the first actuator body CV1.

During a determination step E2 subsequent to the measurement step E1, a first angle $Stat_{MES}$ of the first gate P1 with respect to the first casing C1, called the measured droop angle $Stat_{MES}$, is determined based on the first actual position PRV1, for example by a calculator CAL or by other measurement means.

During a determination step E3 subsequent to the determination step E2, the first closing angular range $ZM_{RECH}$ of the first gate P1, called the measured closing dead zone $ZM_{RECH}$, which corresponds to the fact that the first gasket J1 is compressed so as not to allow the first primary flux FP1 to pass through the first orifice O1 into the first secondary flow FS1 and thus seals the closure of the first gate P1, is determined for the first turbomachine 1 operating in flight. The measured closing dead zone $ZM_{RECH}$ of the first turbomachine 1 is equal to the reference dead zone $ZM_{REF}$, which was predetermined on the second turbomachine 2, called the reference turbomachine, operating on the ground, to which has been added the measured droop angle $Stat_{MES}$ and from which has been subtracted a reference droop angle $Stat_{REF}$ that was predetermined on the second turbomachine 2 operating in flight, according to the following equation:

$$ZM_{RECH}=ZM_{REF}+Stat_{MES}-Stat_{REF}$$

Thus, thanks to the invention, tests for measuring the dead zone in operation of each first turbomachine 1 in flight is avoided, this measured closing dead zone $ZM_{RECH}$ of the first turbomachine 1 depending on the operating point of the first turbomachine 1 and on the altitude.

The droop of the discharge valve VBV1, 48 is a phenomenon encountered on many motors, primarily at altitude. It is manifested by an incapacity to close entirely the first gate 50, P1 where, although the first control signal SC1 is equal to a first closing set point signal SCPF1 of the first gate P1, the measured droop angle $Stat_{MES}$ is not at its set point closing position at 0° but at a different value which could reach 1.5°, as shown by way of an example by the 3 periods ST1, ST2 and ST3 of droop in FIGS. 10, 11 and 12. Droop is a continuous phenomenon and can assume different values between 0° and 3° for example.

In FIG. 11, the measured droop angle $Stat_{MES}$ in degrees in the ordinate varies according to the curve C10, while the first control signal SC1 in degrees on the ordinate varies according to the curve C20, as a function of time t in seconds (s) in the abscissa. FIG. 10 shows, in a manner corresponding to FIG. 11, the force $F_{VBV}$ in the first actuator V1 in Newtons (N) in the ordinate and the aerodynamic force $F_{Aero}$ in Newtons (N) in the ordinate, as a function of time t in seconds (s) in the abscissa. FIG. 12 shows, in a manner corresponding to FIG. 11, the pressure difference $\Delta P_{servo}$ at the terminals of the first servo-valve 48, VBV1 and the pressure difference $\Delta P_V$ at the terminals of the first actuator V1 in bar in the ordinate, as a function of time in seconds (s) in the abscissa. During these droop periods ST1, ST2 and ST3, the force $F_{VBV}$ becomes less than the aerodynamic force $F_{Aero}$ and the pressure difference $\Delta P_V$ at the terminals of the first actuator V1 becomes equal to the pressure difference $\Delta P_{servo}$ at the terminals of the first servovalve 48, VBV1, which indicates that the entire hydraulic power of the first actuator V1 is consumed and does not allow complete closing of the first gate 50, P1.

This phenomenon is explained by the fact that the compression of the first gasket J1 requires a greater and greater force as the first gate 50, P1 is depressed farther into the primary stream in the first closing position PF1. Thus, when the hydraulic power available is no longer sufficient (the effect of altitude in particular), the necessary force for the complete closure of the first gate 50, P1 cannot be supplied, as shown in FIGS. 13 and 14, and the first gasket J1 is not completely compressed, while not letting pass, in the first closing position PF1 the first primary flow FP1, 22 through the first orifice O1 into the first secondary flow FS1, 32, even when the force $F_{VBV}$ in the first actuator V1 is equal to the maximum force $F_{maxVBV}$. The primary stream is then not smooth, i.e. in the first closing position PF1 the first gate 50, P1 is not aligned with the first internal wall 38, 381 and is slightly lifted by the first primary flow 22, FP1 toward the first secondary flow 32, FS1.

According to one embodiment, for the second turbomachine 2 serving as a reference, during a determination step E4 prior to the determination step E3 and for example prior to the measurement step E1, the reference dead zone $ZM_{REF}$, which is a second closing angular range $ZM_{REF}$ of its second gate 50, P2 during which, between its second closing position PF2 and its second opening position PO2 its second gasket J2 is compressed so as not to allow its second primary flow FP2 to pass through its second orifice O2 into its second secondary flow FS2, is determined for the second turbomachine 2 operating on the ground, by measurement means, for example on a test bench on the ground. Of course, the reference dead zone $ZM_{REF}$ can be determined in another manner than according to this embodiment.

According to one embodiment, during a determination step E5 prior to the determination step E3, a first rotation speed N2_1 of the first high-pressure compressor 14, CHP1 of the first turbomachine 1, and a first atmospheric pressure Patm1 or a first altitude Alt1, called measured operating parameters N2_1, Patm1 or Alt1, are determined for the first turbomachine 1 operating in flight, for example by measurement sensors carried on board the first turbomachine 1 and/or on the aircraft comprising it.

According to one embodiment, the calculator CAL comprises a model MOD of the second turbomachine operating in flight, giving the second gate angle $Stat_{REF}$ of the second turbomachine 2 with respect to its second intermediate casing 26, C2, as a function of a second rotation speed N2_2 of its second high-pressure compressor 14, CHP2 and of a second atmospheric pressure Patm2 of the second turbomachine 2 or of a second operating altitude Alt2 of the second turbomachine 2.

This is illustrated by way of an example in FIG. 15, where the second angle $Stat_{REF}$ is in degrees in vertical ordinate, the second rotation speed N2_2 is on a first horizontal axis in revolutions per minute (rpm) in the abscissa and the second altitude Alt2 is on a second horizontal axis in feet (ft) times $10^4$ in the abscissa, perpendicular to the first horizontal axis. FIG. 17 illustrates the situation of the second turbomachine 2, where in the ordinate the reference dead zone $ZM_{REF}$ is equal to the sum of the reference droop angle $Stat_{REF}=f(Alt2, N2\_2)$ of the model MOD and of a second angular gap $EA2_{joint}$ corresponding to the compression of the second gasket J2.

FIG. 16 illustrates the situation of the first turbomachine 1, where in the ordinate the measured closing dead zone $ZM_{RECH}$ is equal to the sum of the measured droop angle $Stat_{MES}=f(Alt1, N2\_1)$ determined based on the model MOD and on a second angular gap $EA1_{joint}$ corresponding to the compression of the first gasket J1.

Of course, in the model MOD, the variable "second operating altitude 2 of the second turbomachine 2" can be transformed into the variable "second operating pressure Patm2 of the second turbomachine 2" and conversely, given that there exists a bijective relation between them, as is known to a person skilled in the art.

According to one embodiment, during a determination step E6 prior to the determination step E3 and subsequent to the determination step E5, the reference droop angle $Stat_{REF}$, which is the second gate angle $Stat_{REF}$ of the second gate 50, P2 of the second turbomachine 2, which corresponds according to the model MOD to the measured operating parameters N2_1, Patm1 or Alt1, i.e. for N2_2=N2_1 and Patm2=Patm1 or Alt2=Alt1, is determined by the calculator CAL, based on the model MOD of the second turbomachine 2 operating in flight.

According to one embodiment, the second gate angle $Stat_{REF}$ of the model MOD corresponds to an angle $Stat_{REF}$ of the second gate 50, P2 with respect to the second casing 26, C2 and has been determined for example by a calculator or by other measurement means during a determination step E7 prior to the determination step E6 and for example prior to the measurement step E1, based on a second actual position PRV2 of the second actuator V2, which for its part was measured for the second turbomachine 2 operating in flight, for example on a test bench in flight by a position sensor of the second actuator V2 or by other measurement means, when its second control signal SC2 is equal to a second closing set point signal SCPF2 of the second gate P2.

The calculator CAL and the measurement means or sensors described above can be part of an estimation device or estimator, implementing the estimation method described above. The calculator CAL operates automatically and can be embodied by a processor or a computer or a server, which are provided with computer processing programs for carrying out the processing described below and permanent memories for recording there the data and the processing carried out. In FIG. 18, an example of an estimator 300 of this type comprises a first input 301 for receiving the measured droop angle $Stat_{MES}$, a second input 302 for receiving the first altitude Alt1, a third input 302 for receiving the first rotation speed N2_1 and an output 304 for supplying the measured closing dead zone $ZM_{RECH}$. The inputs 301, 302 and 303 can be in the form of a data introduction interface. The output 304 can be in the form of a data output interface or a display screen. The calculator CAL for the second turbomachine 2 can be separated from the calculator CAL for the first turbomachine 1.

Of course, the embodiments, features, possibilities and examples above can be combined with one another or be selected independently of one another.

The invention claimed is:

1. A method for estimating a closing dead zone of a first gate of a first discharge valve mounted on a first casing of a turbomachine to be investigated, which can operate in flight to propel an aircraft, the first casing delimiting in its inside a first primary gas flow of the turbomachine, the first gate being designed to be able to be moved angularly by a first actuator depending on a first control signal of the first actuator between one and the other of:
   a first opening position of a first orifice of the first casing configured to discharge by this first orifice a portion of the first primary gas flow into a first secondary gas flow located outside the first casing,
   and a first closing position of the first orifice configured to prevent the first primary gas flow from passing through the first orifice,
   the first gate being provided with a first gas seal gasket, able to be compressed against a first edge of the first orifice in the first closing position to seal closing of the first orifice,
   the method comprising:
   measuring, for the turbomachine to be investigated, operating in flight, a first actual position of the first actuator when the first control signal is equal to a first set point closing signal of the first gate,
   determining, based on the first actual position, a measured droop angle of the first gate with respect to the first casing, and
   determining for the turbomachine to be investigated, operating in flight, a measured closing dead zone of the first gate, in which the first gas seal gasket remains compressed and thus seals closing the first orifice, by the fact that the measured closing dead zone is equal to a reference dead zone, which was predetermined during operation on the ground on a reference turbomachine which can operate in flight and on the ground, to which has been added the measured droop angle and from which has been subtracted a reference droop angle which was predetermined on the reference turbomachine operating in flight to propel an aircraft.

2. The method of claim 1, wherein:
   the reference turbomachine has a second gate of a second discharge valve mounted on a second casing of the reference turbomachine, the second casing delimiting in its inside a second primary gas flow of the reference turbomachine, the second gate being designed to be able to be moved angularly by a second actuator depending on a second control signal of the second actuator between one and the other of:
   a second opening position of a second orifice of the second casing to discharge through the second orifice portion of the second primary gas flow into a second secondary gas flow of the reference turbomachine located outside the second casing,
   and a second closing position of the second orifice to prevent the second primary gas flow from passing through the second orifice,
   the second gate being provided with a second gas seal gasket, able to be compressed against a second edge of the second orifice in the second closing position to seal closing of the second orifice.

3. The method of claim 2, comprising:
   determining, for the reference turbomachine operating on the ground, the reference dead zone, which is a second angular closing range of the second gate, during which, between the second closing position and the second opening position, the second gas seal gasket remains compressed and thus seals closing of the second orifice.

4. The method of claim 2, comprising:
   determining, for the turbomachine to be investigated, operating in flight, a first rotation speed of a first high-pressure compressor of the turbomachine to be investigated, and measured operating parameters comprising at least one quantity selected from among a first atmospheric pressure and a first altitude, and
   determining, based on a model of the reference turbomachine giving a second gate angle of the reference turbomachine with respect to the second casing of the reference turbomachine, depending on a second rotation speed of a second high-pressure compressor of the reference turbomachine and on a second atmospheric pressure of the reference turbomachine or on a second operating altitude of the reference turbomachine, the reference droop angle, which is the second gate angle of the reference turbomachine which corresponds according to the model to the measured operating parameters,
   the second gate angle corresponding to an angle of the second gate with respect to the second casing, which has been determined based on a second actual position of the second actuator, having itself been measured for the reference turbomachine operating in flight, when the second control signal is equal to a second set point closing signal of the second gate.

5. A device for estimating a closing dead zone of a first gate of a first discharge valve mounted on a first casing of a turbomachine to be investigated which can operate in flight to propel an aircraft, the first casing delimiting in its inside a first primary gas flow of the turbomachine, the first gate being designed to be able to be moved angularly by a first actuator depending on a first control signal of the first actuator between one and the other of:
   a first opening position of a first orifice of the first casing configured to discharge through this first orifice a portion of the first primary gas flow into a first secondary gas flow located outside the first casing,
   and a first closing position of the first orifice configured to prevent the first primary gas flow from passing through the first orifice,
   the first gate being provided with a first gas seal gasket, able to be compressed against a first edge of the first orifice in the first closing position to seal closing of the first orifice,
   wherein device comprises
   a first position sensor for measuring, for the turbomachine to be investigated operating in flight, a first actual position of the first actuator when the first control signal is equal to a first set point closing signal of the first gate,
   a calculator configured to at least:
   determine, based on the first actual position, a measured droop angle of the first gate with respect to the first casing, and
   determine, for the turbomachine to be investigated operating in flight, a measured closing dead zone of the first gate, in which the first gas seal gasket remains compressed and thus seals closing of the first orifice, by the fact that the measured closing dead zone is equal to a reference dead zone, which was predetermined during operation on the ground on a reference turbomachine which can operate in flight and on the ground, to which has been added the measured droop angle and from which has been subtracted a reference droop angle which was predetermined on the reference turbomachine operating in flight for propelling an aircraft.

6. The device of claim 5,
wherein the reference turbomachine has a second gate of a second discharge valve mounted on a second casing, the second casing delimiting in its inside a second primary gas flow of the reference turbomachine, the second gate being designed to be able to be moved angularly by a second actuator depending on a second control signal of the second actuator between one and the other of:
a second opening position of a second orifice of the second casing to discharge through this second orifice portion of the second primary gas flow into a second secondary gas flow of the reference turbomachine located outside the second casing,
and a second closing position of the second orifice to prevent the first primary gas flow from passing through the second orifice,
the second gate being provided with a second gas seal gasket, able to be compressed against a second edge of the second orifice in the second closing position to seal closing of the second orifice.

7. The device of claim 6, comprising a measurer for determining, for the reference turbomachine operating on the ground, the reference dead zone, which is a second angular closing range of the second gate, during which, between the second closing position and the second opening position, the second gas seal gasket remains compressed and thus seals closing of the second orifice.

8. The device of claim 6, comprising on-board measurement sensors of the turbomachine to be investigated to determine, for the turbomachine to be investigated operating in flight, a first rotation speed of a first high-pressure compressor of the turbomachine, and measured operating parameters comprising at least one quantity selected from among a first atmospheric pressure and a first altitude,
the calculator being configured to determine, from a model of the reference turbomachine giving a second gate angle of the reference turbomachine with respect to the second casing of the reference turbomachine depending on a second rotation speed of a second high-pressure compressor of the reference turbomachine and from a second atmospheric pressure of the reference turbomachine or from a second operating altitude of the reference turbomachine, the reference droop angle, which is the second gate angle of the reference turbomachine which corresponds according to the model to the measured operating parameters,
a second position sensor for measuring, for the reference turbomachine operating in flight, a second actual position of the second actuator, when the second control signal is equal to a second set point closing signal of the second gate,
the calculator being configured to determine the second gate angle corresponding to an angle of the second gate with respect to the second casing, based on the second actual position of the second actuator.

\* \* \* \* \*